United States Patent [19]
Gold

[11] Patent Number: 5,480,207
[45] Date of Patent: Jan. 2, 1996

[54] PREAFFIXED AUTO WINDSHIELD MOLDING WITH MECHANICAL INTERLOCK

[76] Inventor: Peter Gold, 465 N. Wood Rd., Rockville Centre, N.Y.

[21] Appl. No.: 228,709

[22] Filed: Apr. 18, 1994

[51] Int. Cl.$^6$ .................................................. B60J 10/02
[52] U.S. Cl. ......................... 296/93; 52/204.591; 52/208
[58] Field of Search ................................. 296/93, 96.21, 296/146.15, 201; 52/208, 204.591, 204.597

[56] References Cited

U.S. PATENT DOCUMENTS

| | | | |
|---|---|---|---|
| 4,165,119 | 8/1979 | Hedeen et al. | 296/93 |
| 4,905,432 | 3/1990 | Romie | 296/93 X |
| 5,009,462 | 4/1991 | Katcherian | 296/93 X |

*Primary Examiner*—Andrew C. Pike

[57] ABSTRACT

A molding preaffixed about the periphery of an auto windshield using urethane bondable to glass has a shortcoming by virtue of being inert to any bonding to the rubber construction material of the molding, which is overcome using a substitute mechanical interlock between the urethane and molding, the molding rubber stem being embodied with a cavity for molding the urethane in bonding relation to the glass windshield and the resulting molded shape of the urethane providing structural features for engagement by the molding, i.e., the engaged structural features being the mechanical interlock.

3 Claims, 1 Drawing Sheet

PREAFFIXED AUTO WINDSHIELD MOLDING WITH MECHANICAL INTERLOCK

The present invention relates generally to improvements in installing weather-insulated auto windshields, and more particularly to the effective use of urethane in the aftermarket replacement of damaged Original Equipment Manufacture (OEM) windshields.

The rubber construction material of the trim which insulates the windshield against water and air leakage is inert to chemical bonding with urethane, preferred as the adhesive in auto windshield installations because of its pliability in its initial condition as a viscous mass, and its subsequent curing into a solid condition providing a firm adhesive connection. As a substitute for the unavailable chemical bond, mechanical interlocking substitutes have been proposed such as a frictional grip established between the trim or reveal molding and windshield to supplement the urethane bonding as disclosed and illustrated in my prior U.S. Pat. No. 5,163,731 issued for "Vehicle Reflective Molding" on Nov. 17, 1992, and U.S. Pat. No. 4,165,119 issued on Aug. 2, 1979 to Hedeen et al. which describes a window reveal molding which, according to accepted practice, has retrorse fins on opposite sides of a depending stem to become embedded into the curing urethane. While the aforesaid prior art installation procedures are generally effective, they do not contribute to an optimum firmly established connection between the urethane and rubber molding, nor do they facilitate a preferred technique of preframing the windshield and attaching same as an assembly in the auto windshield opening, as distinguished from an alternative technique of inserting the molding in the gap between a previously positioned windshield and the body flange bounding the windshield opening.

Broadly, it is an object of the present invention to achieve an effective windshield installation using to advantage urethane and a rubber insulating molding overcoming the foregoing and other shortcomings of the prior art.

More particularly, it is an object to substitute an optimum mechanical interlock for the unavailable chemical bond between the urethane and rubber molding, achieved by using the rubber construction material for a material-molding function and the pliable urethane which is amenable to being molded in the carrying out of said function, all as will be better understood as the description proceeds.

The description of the invention which follows, together with the accompanying drawings, should not be construed as limiting the invention to the example shown and described, because those skilled in the art to which this invention appertains will be able to devise other forms thereof within the ambit of the appended claims.

It is already well established in the practice of aftermarket replacement as well as in Original Equipment Manufacture (OEM) auto windshield installations to position a rubber molding about the periphery of the windshield to contribute to a desirable commercial exterior appearance thereto, to serve as a watertight seal against weather-produced leakage internally of the auto, as well as to achieving other understood benefits.

In one type of installation, the undersized windshield is placed in a slightly oversized auto windshield opening, a sealant deposited in the gap therebetween, and the rubber molding hand manipulated into the gap and thus into the sealant to complete the windshield installation.

Figure 1:
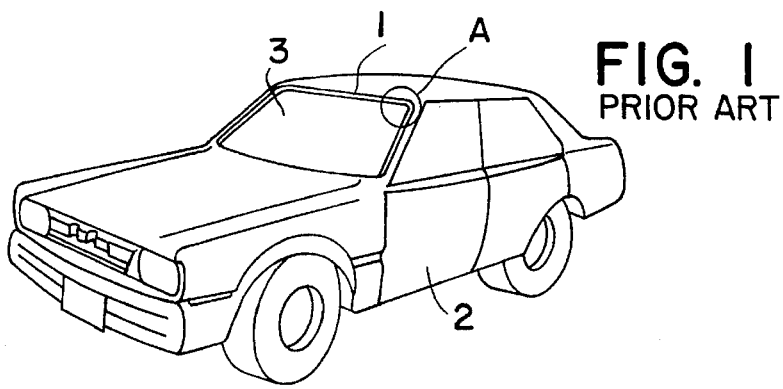
FIG. 1 is a perspective view of an auto with an installed windshield according to prior art practice.
Figure 2:
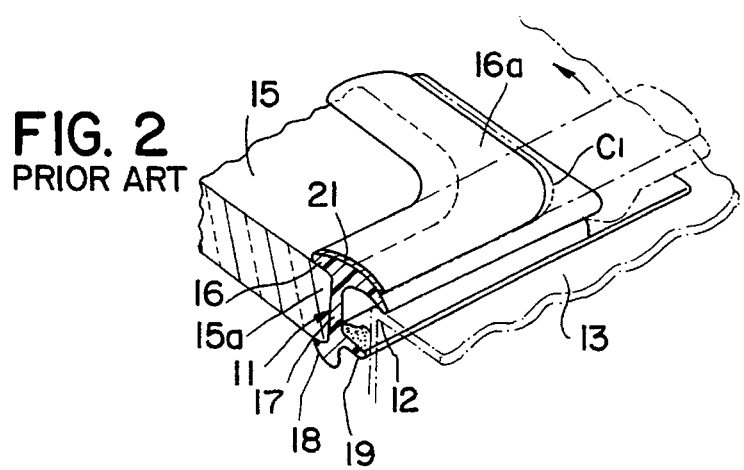
FIG. 2 is a partial perspective view of installation details at the windshield corner designated A in FIG. 1.

In another type of installation to which the inventive improvements hereof are specifically directed, the molding is provided with an operative position in assembled relation about the periphery of the windshield and, as an assembly of windshield and molding, disposed in sealant previously deposited in the gap to complete the windshield installation. This installation practice contemplates storing the assembled or prepositioned molding and windshield until needed, and is particularly preferred for aftermarket installations, and would be even more in use if an effective preventive was available to obviate inadvertent detachment of the molding from the peripheral edge of the windshield while awaiting installation. Currently the prior art practice, as will be more particularly described in connection with FIGS. 1 and 2, is to primarily rely on a friction grip established by the projection of the windshield peripheral edge into a C-shaped configuration in the molding, but this is not entirely satisfactory.

The noted shortcoming of the prior art is overcome in accordance with the present invention by supplementing the frictional grip with a mechanical interlock between the molding and windshield, all as will now be explained in detail.

It is first to be noted that in an auto windshield installation the adhesive or sealant of choice is urethane since, as is well understood, this chemical composition is initially a mass of easy-to-work with pliability that, after a time interval, cures into a solid condition, and perhaps even more important, has an affinity or well understood capacity to chemically bond to glass, the construction material of the windshield. The rubber construction material of choice, because of its pliability and water-seal property, for the molding, however, is inert to chemical bonding to urethane; thus merely depositing a surface coating of urethane at the interface of the molding and windshield peripheral edge is not an effective supplement to the frictional grip therebetween.

Underlying the present invention is providing a mechanical interlock by advantageous use of urethane and the molding rubber construction material by recognizing that urethane is moldable and that the rubber can function as its mold, whereby the urethane can be molded to the glass with structural features engageable by the molding, and that such engagement obviates inadvertent disengagement of the molding from the windshield.

For completeness sake, it is helpful to note the prior art practice replaced by the within invention, as will now be briefly described in connection with FIGS. 1 and 2 depicting what is illustrated and described in Japanese Utility Model Application No. 63-27132 laid open to public inspection on Aug. 15, 1989 under No. 1-202519, and believed to be most exemplary of said prior art practice. As numerically-identified in the prior art reference, shown in FIG. 1 is an auto 2 having an installed windshield 3 in an auto windshield opening 1.

In FIG. 2 are shown the installation details in the vicinity of the windshield corner A, including a rubber molding 11 having an upper crown 16, a depending stem 17, and a gripper leg 18, the space or clearance 15a between the crown overhang beyond the edge 21 and the gripper leg 18 being slightly undersized in relation to the thickness of the glass windshield 15 projected into the clearance 15a, such that a friction grip is established therebetween. Prior to actual installation, the molding 11 is provided with its operative position assembled to the windshield 15, as noted by the bending of the crown length portion 16a about the corner radius C1 of the windshield, and the assembly 11, 15 maintained in storage until needed. During subsequent replacement windshield installation, the auto windshield opening 1 being more particularly, and in a well understood manner, bounded by a flange bent at 12 from a body panel 13, forms a gap from the glass edge 15a to the bent flange which has to be bridged by the molding crown 16, and this is achieved by the installation. To hold the installed assembly of windshield and molding 15, 11 in place, there is previously deposited in the noted gap a sealant mass 19 which, if urethane, will cure into a solid condition and engage the gripper leg 18 to complete the windshield installation.

Figure 3:
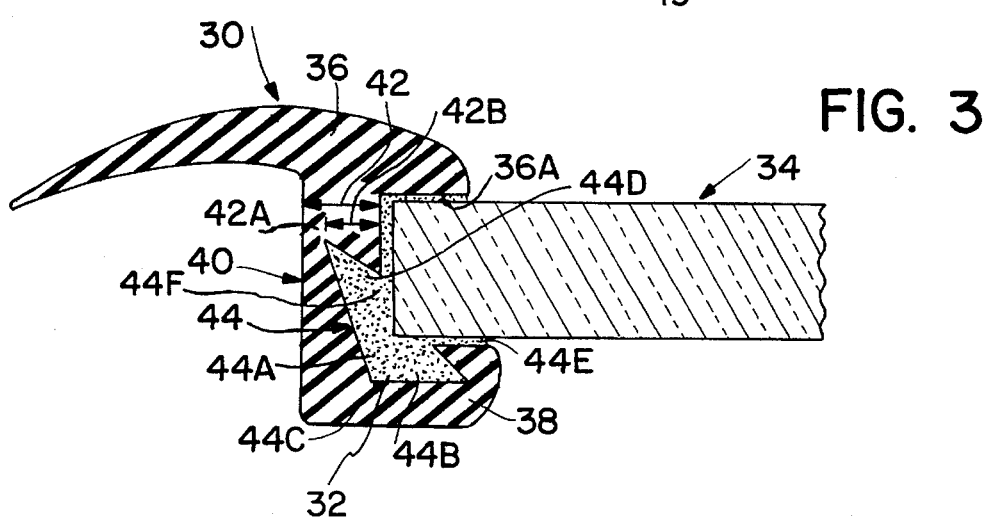
FIG. 3 is an enlarged scale cross sectional view of the within inventive molding in its operative position, according to the present invention, attached to solidified urethane chemically bonded to the windshield.

To facilitate the prior art practice of installing a preaffixed molding to the windshield as just described, in which inadvertent detachment of the molding is significantly obviated, the within invention contemplates, as best shown in FIG. 3, a rubber molding, generally designated 30, using to advantage urethane 32. The glass windshield 34, and more particularly the peripheral edge 34A, is projected in the slightly undersized clearance between the glass overhang 36A of an upper crown 36 and a gripper leg 38 in approximate parallel relation to the crown 36, which gripper leg is connected to a depending stem 40.

Characterizing the molding stem 40 is a selected increased thickness 42, a portion 42A of which is allotted to establishing the connection of the crown 36 to the gripper leg 38. The remaining portion 42B is used to embody a combination urethane-molding and urethane-gripping compartment 44 having a shape of a ninety-degree angle at the juncture of said stem 40 and gripper leg 38, wherein said embodiment is readily achieved during the extrusion of the rubber molding 30 in the well understood operating mode of the extrusion die which produces the illustrated FIG. 3 profile of the molding 30.

Thus, as clearly illustrated in FIG. 3, compartment 44 is bounded by rear walls 44A, 44B angled at connection 44C, and opposite end angled side walls 44D and 44E which define an opening 44F into the compartment 44.

Figure 4:
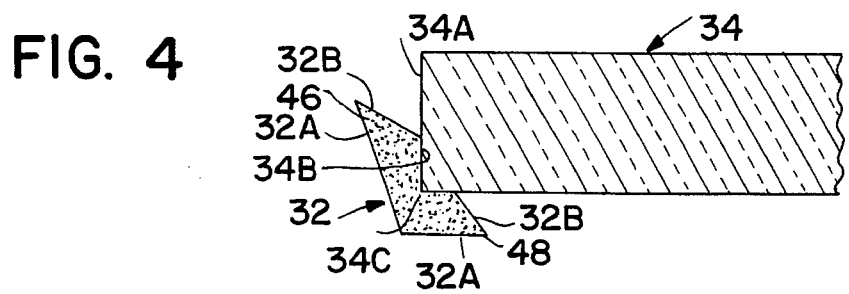
FIG. 4 is a view similar to FIG. 3 but illustrating in isolated perspective the windshield and urethane in their bonded together condition.

In use, urethane 32 in its initial or "green" state as a viscous mass is gunned or otherwise appropriately deposited lengthwise of the molding compartment 44, in an amount which preferably slightly exceeds the volume of compartment 44, thus assuring that the urethane mass will project slightly through the opening 44F. The molding 30 is next attached to the windshield 34, during which the peripheral windshield edge 34A projects into the clearance between the crown overhang 36A and gripper leg 38 and contact along opposite sides 34B of the glass along its bottom edge 34C is made with the urethane mass 32, as best illustrated in FIG. 4. After a well understood time interval, the urethane 30 cures into a solid condition and a firm chemical bond established between the urethane 30 and windshield edge 34A. Although due to the rubber construction material of the molding 30 being inert to the urethane 32 preventing an effective adhesive bonding therebetween, the angle of the compartment sides 44D and 44E are in a converging orientation or nature in directions effective to hold the molding 30 in a mechanical interlock, as a substitute for the unavailable bonding connection to the solidified urethane 32 which, as noted, is firmly attached to windshield edge 34A. That is, the urethane 32 being effectively bonded to the windshield 34 and the molding 30 connected by the mechanical interlock to the urethane, it necessarily follows that the molding 30 is in an attached or assembled condition to the windshield 34 that there is no longer reliance solely on the prior art friction fit.

In the isolated perspective of the windshield-attached and solidified urethane 32 of FIG. 4, it is to be noted that the urethane is seated about the glass bottom corner 34C and the urethane surfaces 32A, 32B respectively subtending acute angles as illustrated, thus provide the engageable structural features at 46 and 48 for the molding 30, which holds the molding in place in its operative position in encircling relation about the windshield peripheral edge 34A.

While the prepositioned or preaffixed auto windshield molding herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In an auto windshield installation during which a glass windshield has a molding in an operative position in assembled relation about a peripheral edge of said windshield preparatory to being disposed as an assembly of said windshield and said molding into an auto windshield opening to complete said installation, the using to advantage in said installation of firstly urethane of a type that is chemically bondable to glass, and of secondly a rubber construction material for said molding that, although of a type inert to chemical bonding to said urethane, has as an effective substitute a mechanical interlock to said urethane, said molding comprising an upper crown, a bottom gripper leg in approximate parallel relation to said upper crown so as to bound a clearance therebetween sized to frictionally engage said peripheral edge of said windshield projected into said clearance, and a stem depending from said crown connected in spanning relation therefrom to said gripper leg wherein the improvement comprises said stem having a selected increased thickness, a portion of said stem thickness providing a connection of said crown to said gripper leg, and a remaining portion of said stem thickness embodying a combination urethane-molding and urethane-gripping compartment, said compartment having a shape of a ninety-degree angle and being located at a juncture of said stem and said gripper leg for being seated about a ninety-degree shape of a bottom edge of said windshield periphery, and said compartment further having at opposite ends thereof respective sides inclined at an angle in a direction effective to hold said molding in attached relation to said urethane previously deposited in said compartment incident to being molded therein while in contact with said windshield peripheral edge and curing into a solid condition, whereby holding of said molding to said solid urethane chemically bonded to said windshield correspondingly mechanically interlocks said molding to said windshield to obviate inadvertent disengagement therefrom so as to contribute to facilitating said installation of said windshield in said auto windshield opening.

2. The auto windshield installation as claimed in claim 1 in which said compartment sides are of a converging nature in relation to an opening into said compartment.

3. In an auto windshield installation during which a glass windshield has a molding in an operative position in assembled relation about a peripheral edge of said windshield preparatory to being disposed as an assembly of said windshield and said molding into an auto windshield opening to complete said installation, the using to advantage in said installation of firstly urethane of a type that is chemically bondable to glass, and of secondly a rubber construction material for said molding that, although of a type inert to chemical bonding to said urethane, has as an effective substitute a mechanical interlock to said urethane, said molding comprising an upper crown, a bottom gripper leg in approximate parallel relation to said upper crown so as to bound a clearance therebetween sized to frictionally engage said peripheral edge of said windshield projected into said clearance, and a stem depending from said crown connected in spanning relation therefrom to said gripper leg wherein the improvement comprises said stem having a selected increased thickness, a portion of said stem thickness providing a connection of said crown to said gripper leg, and a remaining portion of said stem thickness embodying a combination urethane-molding and urethane-gripping compartment, said compartment having a shape of a ninety-degree angle and being located at a juncture of said stem and said gripper leg for being seated about a ninety-degree shape of a bottom edge of said windshield periphery, and said compartment further having a configurated side in said stem and a configurated side in said gripper leg cooperating to hold said molding in attached relation to said urethane previously deposited in said compartment incident to being molding therein while in contact with said windshield peripheral edge and curing into a solid condition, whereby holding of said molding to said solid urethane chemically bonded to said windshield corresponding mechanically interlocks said molding to said windshield to obviate inadvertent disengagement therefrom so as to contribute to facilitating said installation of said windshield in said auto windshield opening.

* * * * *